F. H. FARRINGTON.
CAR HEATING AND VENTILATING APPARATUS.
APPLICATION FILED JAN. 24, 1908.
940,636.
Patented Nov. 16, 1909.
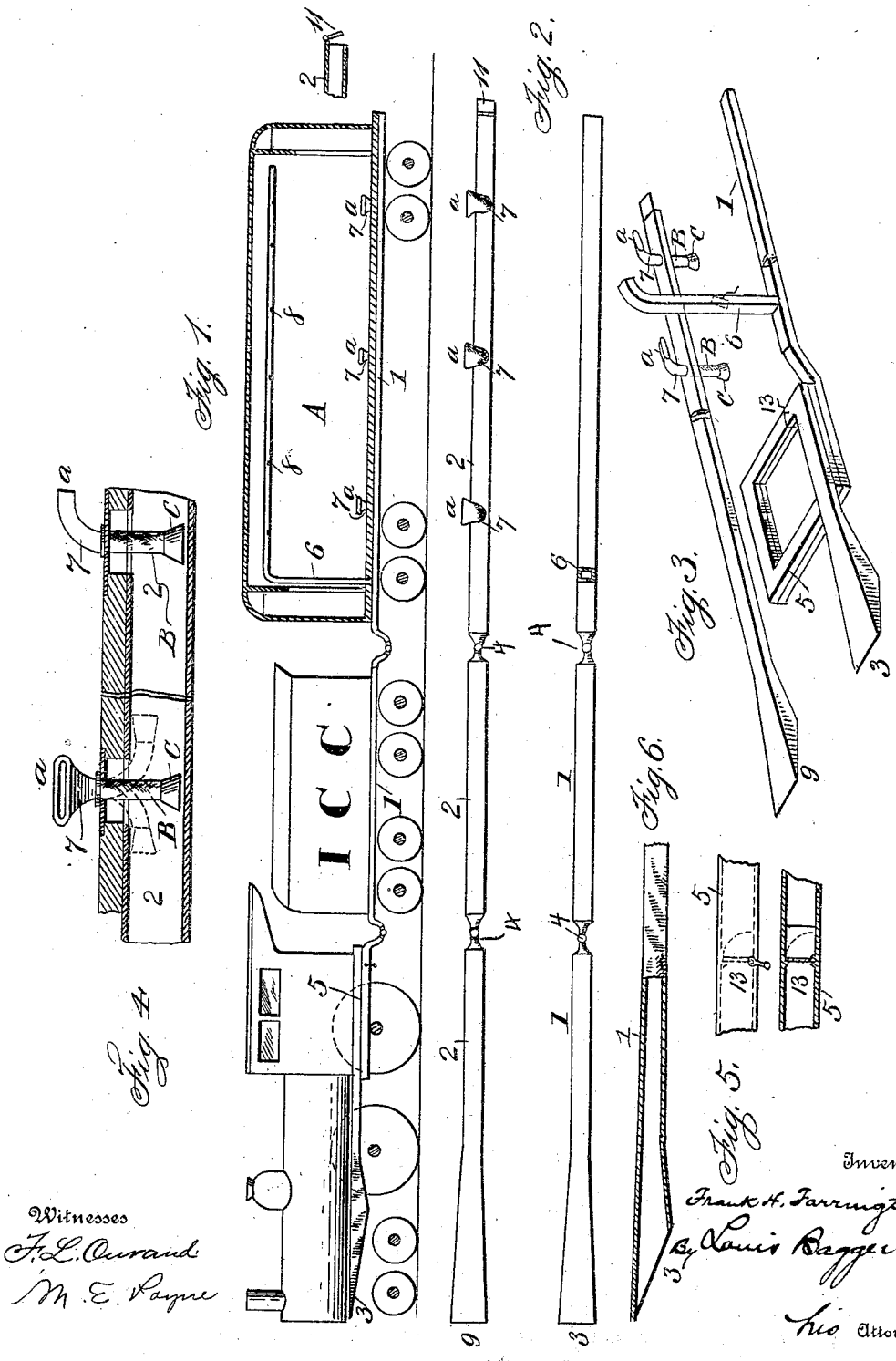

UNITED STATES PATENT OFFICE.

FRANK HENRY FARRINGTON, OF LOUISVILLE, KENTUCKY.

CAR HEATING AND VENTILATING APPARATUS.

940,636.     Specification of Letters Patent.     Patented Nov. 16, 1909.

Application filed January 24, 1908. Serial No. 412,514.

*To all whom it may concern:*

Be it known that I, FRANK HENRY FARRINGTON, a citizen of the United States, residing at Louisville, in the county of Jefferson and State of Kentucky, have invented certain new and useful Improvements in Car Heating and Ventilating Apparatus, of which the following is a specification.

My invention relates to an improvement in car heating and ventilating apparatus, and the object is to provide means whereby a train will be dust-proof and at the same time having the car ventilated by fresh air coming in and the foul air passing out. The fresh air before it passes into the cars is heated in the winter, whereby it not only heats the car, but brings in the fresh air, and the means for carrying the foul air from the cars are so arranged that the air cannot return but is forced to pass out.

The invention relates to certain other novel features of construction and combinations of parts which will be hereinafter described and pointed out in the claims.

In the accompanying drawings Figure 1 is a view showing my invention applied to an engine and car, the car being partly in section. Fig. 2 is a plan view of the supply and exhaust pipes; Fig. 3 is a view in perspective of the same, and Figs. 4, 5 and 6 are details.

A, represents a car to which my improvement is attached, and which is supplied with two pipes 1 and 2, 1 being the supply pipe and 2 the exhaust. The supply pipe is connected to the engine in any suitable manner and has its forward end with an enlarged opening as at 3. The pipe is adapted to coil around the fire-box, thereby heating the air. The pipe leads along beneath the car, and has suitable connection at different points, or preferably at the connection of the different cars, where they are coupled together as at 4. Leading from the main pipe 1 up into the car and extending approximately the length thereof, are distributing pipes 6, 6. These pipes are provided with perforations or slotted openings 8, 8 whereby the air is permitted to issue from the pipes throughout the car, and also from the open end of the distributing pipe. A governor is placed on the pipes 6, 6 to regulate the amount of air passing into the cars.

The supply pipe 1 is provided with a trap door or valve 13 for closing the coil leading from the supply pipe which encircles the fire-box of the engine. When the trap door is closed in the coils 5 the air will travel in a straight line instead of encircling the fire-box before going to the cars, the object in this being to provide cool, fresh air to the cars in summer time, and in the winter the valve can be opened permitting the air to travel through the coils 5, whereby they will become heated and warm air will be distributed in the coils.

On the other side of the car, the exhaust pipe 2 extends, having an enlarged opening 9 at its forward end, for the admission of air and provided with couplings for connecting the pipes together from one car to another, and extending upwardly into each coach are exhaust tubes 7, 7, which comprise a nozzle *a* which extends through an opening in the floor of the car near the aisle and under the seat, which nozzle has its upper end bent or rounded at approximately right angles to the main portion of the nozzle. Connected to the nozzle and extending through the floor is a flexible tubing B, and connected to the lower end of the tube is a bell-shaped tube C. The flexible tubing B and bell-shaped tube C extend into the exhaust pipe 2. By having these exhaust tubes 7, 7 provided with a flexible connection the air as it passes through the pipe will cause a suction, drawing the foul air through the tubes into the pipe 2 where it passes through this pipe to the outer air and can be used with the car traveling in either direction as the flexible tubing permits the bell to be drawn in the direction in which the force of air traveling through the pipe is going or to be drawn toward the rear of the car. The end of the pipe 2 has a flat valve 11, which closes the pipe when the train is not in motion, thereby preventing any air from entering the pipe from the rear. The pipe 1 is closed at its rear end thereby preventing any fresh or any hot air from passing out of the pipe and causing it to enter the distributing pipes 6, 6.

The air will enter the pipes 1 and 2 as the train moves with a great deal of force, and the fresh air entering the pipe 1 will become heated by the contact of the fire-box with the coils 5, and will pass on to the distributing pipes 6, 6, whereby it is discharged into the car throughout the length thereof through perforations and slotted openings in the pipes. The air passing through pipe 2 will open the flap valve 11, and as it passes through this pipe creates a suction on the exhaust tubes 7, 7, causing the foul air in the cars to be drawn into the pipe whereby it will be caused to pass out of the rear end of the pipe. By this method the car can be heated and ventilated and will relieve the odors which are common in cars at present due to the fact of the heating means now in use, which throw off a disagreeable odor, and which objection is relieved by having fresh air heated through its travel to the cars, which air is eventually discharged into the coach.

It is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent is:

1. A car heating and ventilating apparatus, comprising pipes for conducting air, one of said pipes coiled around the fire-box of the engine for heating the same, said coils having a valve therein, a distributing pipe connected to said pipe, and the other pipe having flexible suction means connected thereto for discharging the foul air from the car.

2. A car heating and ventilating apparatus, comprising pipes for conducting air, one of said pipes coiled around the fire-box of the engine, a distributing pipe connected to said pipe, means within the coil whereby the air may be allowed to pass through the coil for heating the same or pass through to the distributing pipe without being heated, and the other pipe having flexible suction means connected thereto for discharging the foul air from the car.

3. A car heating and ventilating apparatus, comprising pipes adapted to extend the length of the train, one of said pipes coiled around the fire-box of the engine, a distributing pipe connected to said pipe adapted to extend approximately the length of the coach, a valve at the junction of the coil and the distributing pipe whereby the air may pass through the coil to be heated or pass directly into the distributing pipe without being heated and the other pipe having flexible suctions means connected thereto and extending into the car for removing the foul air.

In testimony whereof I affix my signature in presence of two witnesses.

FRANK HENRY FARRINGTON.

Witnesses:
   A. C. HUTSON,
   B. H. LOVELACE.